United States Patent
Ikeda et al.

(10) Patent No.: US 10,037,833 B2
(45) Date of Patent: Jul. 31, 2018

(54) INSULATED WIRE, COIL, AND ELECTRICAL OR ELECTRONIC EQUIPMENT, AND METHOD OF PRODUCING THE INSULATED WIRE

(71) Applicants: FURUKAWA ELECTRIC CO., LTD., Tokyo (JP); FURUKAWA MAGNET WIRE CO., LTD., Tokyo (JP)

(72) Inventors: Keisuke Ikeda, Tokyo (JP); Hideo Fukuda, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 0 days.

(21) Appl. No.: 15/453,472

(22) Filed: Mar. 8, 2017

(65) Prior Publication Data

US 2017/0178765 A1  Jun. 22, 2017

Related U.S. Application Data

(63) Continuation of application No. PCT/JP2015/075501, filed on Sep. 8, 2015.

(30) Foreign Application Priority Data

Sep. 9, 2014 (JP) .................................. 2014-183638

(51) Int. Cl.
*H01F 5/06* (2006.01)
*H01B 7/02* (2006.01)
(Continued)

(52) U.S. Cl.
CPC ........... *H01B 7/0275* (2013.01); *H01B 3/308* (2013.01); *H01B 3/427* (2013.01); *H01B 13/148* (2013.01); *H01F 5/06* (2013.01)

(58) Field of Classification Search
CPC . H01B 7/02; H01B 13/14; H01B 3/30; H01B 3/42; H01B 7/0275; H01B 3/308; H01B 3/427; H01B 13/148; H01F 5/06
(Continued)

(56) References Cited

U.S. PATENT DOCUMENTS 9,142,334 B2 * 9/2015 Muto .................... H01B 3/301
2010/0144955 A1  6/2010 El-Hibri et al.
(Continued)

FOREIGN PATENT DOCUMENTS

JP       3-062414 U    6/1991
JP       5-255832 A    9/1993
(Continued)

OTHER PUBLICATIONS

Plastic Molding Tutorial #106 Glass Transition Temperature Tg of Plastics Technical Tutorial—MISUMI Dec. 16, 2011.*
(Continued)

*Primary Examiner* — Timothy Thompson
*Assistant Examiner* — Michael F McAllister
(74) *Attorney, Agent, or Firm* — Birch, Stewart, Kolasch & Birch, LLP

(57) ABSTRACT

An insulated wire, having at least one layer as an insulation layer, on an outer periphery of a conductor, wherein at least one layer as the insulation layer is composed of a mixed resin of a crystalline resin (A) and a resin (B) having a glass transition temperature higher, by 30° C. or more, than a glass transition temperature of the crystalline resin (A), in which the glass transition temperature is measured by a thermomechanical analysis, and a mixing mass ratio of the mixed resin (a mass of the crystalline resin (A):a mass of the resin (B)) is 90:10 to 51:49; a coil; an electric or electronic equipment; and a method of producing the insulated wire.

9 Claims, 1 Drawing Sheet

(51) Int. Cl.
*H01B 3/30* (2006.01)
*H01B 3/42* (2006.01)
*H01B 13/14* (2006.01)

(58) Field of Classification Search
USPC .................................................. 174/120 SR
See application file for complete search history.

(56) References Cited

U.S. PATENT DOCUMENTS

| | | | |
|---|---|---|---|
| 2011/0226508 A1* | 9/2011 | Aoi | C08L 81/02 174/120 SR |
| 2012/0100324 A1* | 4/2012 | Sanner | C08G 73/1046 428/36.9 |
| 2012/0154099 A1* | 6/2012 | Fukuda | H01B 3/301 336/222 |
| 2013/0032377 A1* | 2/2013 | Morishita | H01B 13/14 174/120 SR |
| 2013/0037305 A1* | 2/2013 | Fournier | C08G 59/5033 174/120 C |
| 2013/0130031 A1 | 5/2013 | Yamazaki et al. | |
| 2013/0255992 A1* | 10/2013 | Yamazaki | H01B 3/301 174/120 SR |
| 2014/0329087 A1 | 11/2014 | Masuda et al. | |
| 2015/0021067 A1 | 1/2015 | Muto et al. | |
| 2015/0027748 A1 | 1/2015 | Fukuda et al. | |

FOREIGN PATENT DOCUMENTS

| | | | |
|---|---|---|---|
| JP | 2010-067521 | * | 3/2010 |
| JP | 2010-123389 | * | 6/2010 |
| JP | 2010-123389 A | | 6/2010 |
| JP | 2012-243614 | * | 12/2012 |
| JP | 2013-109874 A | | 6/2013 |
| JP | 5391324 B1 | | 1/2014 |
| JP | 5391341 B1 | | 1/2014 |
| WO | WO 2013/088968 A1 | | 6/2013 |
| WO | WO 2014/122828 A1 | | 8/2014 |

OTHER PUBLICATIONS

International Search Report (PCT/ISA/210) issued in PCT/JP2015/075501 , dated Nov. 24, 2015.
Written Opinion (PCT/ISA/237) issued in PCT/JP2015/075501 , dated Nov. 24, 2015.
Extended European Search Report dated Mar. 15, 2018 for corresponding European Application No. 15840156.2.

* cited by examiner

INSULATED WIRE, COIL, AND ELECTRICAL OR ELECTRONIC EQUIPMENT, AND METHOD OF PRODUCING THE INSULATED WIRE

CROSS-REFERENCE TO RELATED APPLICATIONS

This application is a Continuation of PCT International Application No. PCT/JP2015/075501 filed on Sep. 8, 2015, which claims priority under 35 U.S.C. § 119 (a) to Japanese Patent Application No. 2014-183638 filed in Japan on Sep. 9, 2014. Each of the above applications is hereby expressly incorporated by reference, in its entirety, into the present application.

TECHNICAL FIELD

The present invention relates to an insulated wire, a coil, and an electrical or electronic equipment, and a method of producing the insulated wire.

BACKGROUND ART

In a recent electric or electronic equipment (electric or electronic device) (also referred to as electrical equipment), in order to prevent deterioration (inverter surge deterioration) caused by a surge voltage generated by switching of inverter elements, such an insulated wire (wire) that can withstand a surge voltage having several hundred volts has been required in several cases (see Patent Literature 1).

Further, advance of the electrical equipment represented by motors or transformers, has been progressed resulting in size reduction and improved performance. Thus, it becomes usual in many cases that insulated wires are used in such a way that the insulated wires are processed by winding (also referred to as coil processing or bending) to winding the resultant wires (coils) and they are pushed into a quite small space to pack. Specifically, it is no exaggeration to say that the performance of a rotating electric machine, such as a motor, is determined by how many coils produced by coil processing the insulated wires into a coil shape can be held in a stator slot. As a result, improvement of the ratio of the sectional area of conductors to the sectional area of the stator slot (i.e. space factor) has been required to be highly increased. For the reasons discussed above, it has been lately attempted to use a rectangular wire in which the conductor has a cross-sectional shape similar to a quadrilateral (square or rectangle), as a means for increasing the space factor.

The resin to be used in the insulation layer in the insulated wire is ordinarily applied in one kind. However, proposals have recently been made on use of a mixed resin prepared by mixing two kinds of resins.

For example, in order to compensate a disadvantage of poor chemical resistance to readily cause cracks, in a polyethersulfone resin having excellent thermal softening resistance and flexibility, Patent Literature 2 proposes simultaneous use of 10 to 50 mass % of polyphenylenesulfide resin or polyetheretherketone resin. Moreover, in order to achieve heat resistance and high partial discharge inception voltage (PDIV), Patent Literature 3 proposes use of a resin composition having a phase separation structure in which a polyetheretherketone resin is applied as a continuous phase and in which a resin having relative permittivity of 2.6 or less is applied as a dispersed phase. Further, in order to improve insulation property by using a resin having low relative permittivity, Patent Literature 4 proposes mixing of 5 to 50 mass % of fluorocarbon resin formed of a copolymer of perfluoroethylene and perfluorinated alkoxyethylene with an aromatic polyetherketone resin.

CITATION LIST

Patent Literatures

Patent Literature 1: Japanese Patent No. 5391324
Patent Literature 2: JP-A-2010-123389 ("JP-A" means unexamined published Japanese patent application)
Patent Literature 3: JP-A-2013-109874
Patent Literature 4: WO 2013/088968 A1

SUMMARY OF INVENTION

Technical Problem

When an electric current passes through an insulated wire assembled into electrical equipment, the insulated wire reaches a high temperature by heat generated. In the electrical equipment to be used in automobiles and the like, size reduction and high output have been achieved year after year, and in association therewith, a high temperature inside the equipment is caused to such a temperature over 200° C. in several cases. According to study of the inventors of the present invention, the inventors of the present invention found that break down voltage (BBV) of the insulated wire which is subjected to coil working and wound therearound, to be housed in a stator slot is lowered under such a high temperature, for example.

As a result of analyzing this cause, the inventors of the present invention found that such a lowering is caused, by a coating being squeezed and made to be thinned in the insulated wire in a part to which pressure is applied, of the insulated wire wound therearound in a narrow space, as shown in FIG. 2, for example.

This squeeze of the coating depends on crystallinity of the resin which constitutes the coating. When the crystallinity of the resin is low, for example, in the case of polyetheretherketone (PEEK) in which the crystallinity is 36.4%, the inventors of the present invention found that a thickness of the coating is squeezed as much as 30% at a compression pressure of 10 to 20 MPa. Therefore, the inventors of the present invention found that, if the resin having high crystallinity is used, while coating squeeze is suppressed, percent elongation at breakage is lowered.

Accordingly, the present invention is contemplated for providing an insulated wire having excellent thermal aging resistance, without depending on crystallinity of the resin to be used, and also maintained or improved mechanical properties, and suppressed lowering of break down voltage after heating in a state of being wound around an iron core; for providing a coil using the same; and for providing an electric or electronic equipment using the same.

Further, the present invention is contemplated for providing a method of producing the insulated wire as being excellent in above.

Solution to Problem

As mentioned above, according to one kind of resin, if coating squeeze is suppressed by enhancing crystallinity of the resin to be used, percent elongation at breakage thereof is conversely lowered, and therefore it has been difficult to satisfy both suppression of coating squeeze and suppression of lowering of percent elongation at breakage. Therefore, in order to satisfy both suppression, the inventors of the present invention have conducted study by using a mixed resin in which at least two kinds of resins are combined. Specifically, the inventors of the present invention have conducted study, in various manners, in consideration of characteristics of the insulated wire also, under a high temperature environment in assumption of an inside of a device in which the insulated wire is used, particularly under an environment of 200° C., which may actually occur. As a result, the inventors of the present invention have found that a combination of a crystalline resin and a resin having a glass transition temperature different therefrom is effective, and completed the present invention by further conducting study.

That is, the present invention provides the following means:

(1) An insulated wire, comprising at least one layer as an insulation layer, on an outer periphery of a conductor, wherein
at least one layer as the insulation layer is composed of a mixed resin of a crystalline resin (A) and a resin (B) having a glass transition temperature higher, by 30° C. or more, than a glass transition temperature of the crystalline resin (A), in which the glass transition temperature is measured by a thermomechanical analysis, and a mixing mass ratio of the mixed resin (a mass of the crystalline resin (A):a mass of the resin (B)) is 90:10 to 51:49.
(2) The insulated wire described in the above item (1), wherein the glass transition temperature of the resin (B) is higher, by 50° C. or more, than the glass transition temperature of the crystalline resin (A).
(3) The insulated wire described in the above item (1) or (2), wherein the crystalline resin (A) includes at least one resin selected from polyetheretherketone, polyetherketoneketone, polyetherketone, polyetherketoneetherketoneketone, and polyphenylene sulfide.
(4) The insulated wire described in any one of the above items (1) to (3), wherein the resin (B) includes at least one resin selected from polyphenylsulfone, polysulfone, polyethersulfone, polyetherimide, and thermoplastic polyimide.
(5) The insulated wire described in any one of the above items (1) to (4), wherein the insulation layer composed of the mixed resin is an extrusion covering resin layer.
(6) The insulated wire described in any one of the above items (1) to (5), comprising a thermosetting resin layer including at least one resin selected from polyamideimide, polyetherimide, polyimide, and H-class polyester, on the outer periphery of the conductor.
(7) A coil, wherein the insulated wire described in any one of the above items (1) to (6) is subjected to winding working.
(8) An electric or electronic equipment, comprising the coil described in the above item (7).
(9) A method of producing an insulated wire, comprising at least one layer as an insulation layer, on an outer periphery of a conductor, wherein
at least one layer as the insulation layer is composed of a mixed resin of a crystalline resin (A) and a resin (B) having a glass transition temperature higher, by 34° C. or more, than a glass transition temperature of the crystalline resin (A), in which the glass transition temperature is measured by a thermomechanical analysis, and a mixing mass ratio of the mixed resin (a mass of the crystalline resin (A):a mass of the resin (B)) is 90:10 to 51:49, and wherein
the method comprises: a step of extruding a resin composition, including the mixed resin, on the outer periphery of the conductor, to form the insulation layer.
(10) The method of producing the insulated wire described in the above item (9), comprising: a step of forming a thermosetting resin layer including at least one resin selected from polyamideimide, polyetherimide, polyimide, and H-class polyester, on the outer periphery of the conductor.

Advantageous Effects of Invention

The present invention can provide an insulated wire having excellent thermal aging resistance, without depending on crystallinity of the resin to be used, as is different from the conventional art, and also having maintained or improved mechanical properties, and having suppressed lowering of break down voltage after heating in a state of being wound around an iron core; can provide a coil using the same; and can provide an electric or electronic equipment using the same.

Moreover, according to the present invention, there can be provided: a method of producing an insulated wire having excellent performance as described above.

Other and further features and advantages of the invention will appear more fully from the following description, appropriately referring to the accompanying drawings.

MODE FOR CARRYING OUT THE INVENTION

<<Insulated Wire>>

An insulated wire of the present invention has: a conductor; and at least one layer of an insulation layer, on an outer periphery of the conductor. This insulated wire preferably has at least one layer of the insulation layer, which is an extrusion covering resin layer.

Figure 1:
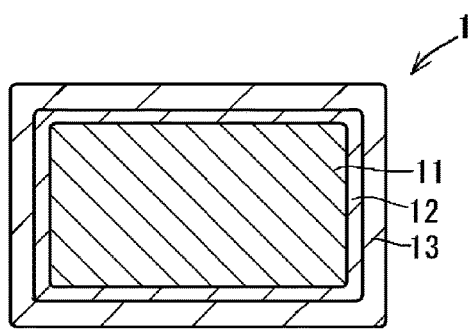
FIG. 1 is a schematic cross-sectional view showing a preferred embodiment of the insulated wire of the present invention.

Herein, FIG. 1 schematically shows a cross-sectional view of an insulated wire 1 according to a preferred embodiment of the present invention. Herein, the insulated wire is shown in which an insulation layer is formed on an outer periphery of a conductor 11, and this insulation layer is composed of a two-layered structure in which a thermosetting resin layer 12 in contact with the conductor, and an extrusion covering resin layer 13 are laminated. The insulated wire has the thermosetting resin layer 12, which is a particularly preferred embodiment in the present invention.

Figure 2:
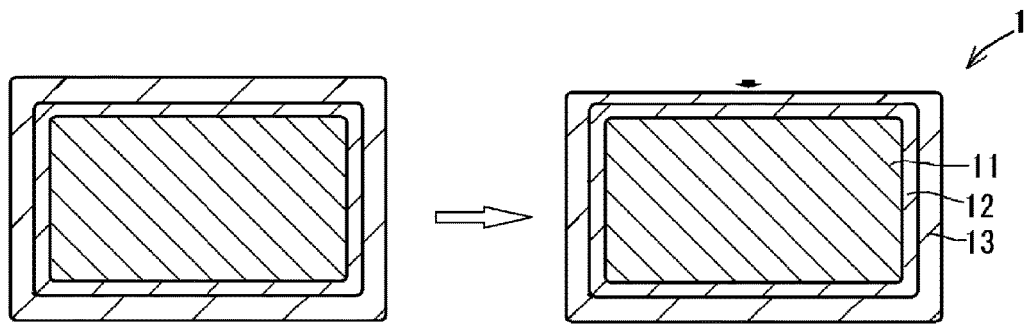
FIG. 2 is a schematic cross-sectional view schematically showing coating squeeze which is caused when the insulated wire is heated in a state of being wound therearound.

FIG. 2 is a diagram schematically showing coating squeeze which is caused when the insulated wire wound therearound is heated, to show a phenomenon which occurs when pressure is applied from above in the diagram. In addition, in the diagram on a right side, the coating squeeze is caused.

A total thickness of the electrical wire coating (a total of thicknesses of all insulation layers: the total thickness from the conductor to a surface of the layer) in a cross section perpendicular to a longitudinal direction of the insulated wire of the present invention, is preferably 50 to 300 μm, and more preferably 60 to 200 μm.

Hereinafter, the conductor, the extrusion covering resin layer, and the insulation layer other than the extrusion covering resin layer will be described in the order.

<Conductor>

As the conductor that can be used in the present invention, use may be made of any conductor that is usually used in insulated wires, and examples thereof include a metal conductor, such as a copper wire and an aluminum wire. The conductor is a conductor of preferably a low-oxygen copper whose oxygen content is 30 ppm or less, and more preferably a low-oxygen copper whose oxygen content is 20 ppm or less or an oxygen-free copper. When the conductor is melted by heat for the purpose of welding if the oxygen content is 30 ppm or less, voids caused by contained oxygen are not occurred at a welded portion, the deterioration of the electrical resistance of the welded portion can be prevented, and the strength of the welded portion can be secured.

A conductor that can be used in the present invention is the conductor whose cross-sectional shape may be any of round (circular), quadrilateral (rectangular), or hexagonal. The rectangular conductor has higher space factor of the conductor with respect to the stator slot at the time of winding, compared to a round conductor, which is preferable.

The size (cross-sectional shape) of the rectangular conductor is not particularly limited, but the width (long side) thereof is preferably from 1 to 5 mm, and more preferably from 1.4 to 4.0 mm, and the thickness (short side) is preferably from 0.4 to 3.0 mm, and more preferably from 0.5 to 2.5 mm. The ratio of length of the width (long side) and the thickness (short side), the ratio of thickness:width, is preferably from 1:1 to 1:4.

Further, the rectangular conductor has preferably such a shape that chamfered corners (curvature radius r) are provided at four corners. The curvature radius r is preferably 0.6 mm or less and more preferably in a range from 0.2 to 0.4 mm.

In the case of the conductor in which the cross section is round, a size (cross-sectional shape) is not particularly limited, but a diameter is preferably 0.3 to 3.0 mm, and more preferably 0.4 to 2.7 mm.

<Extrusion Covering Resin Layer>

In the insulated wire of the present invention, at least one layer as the insulation layer is composed of the mixed resin formed of at least two kinds of resins.

This insulation layer is preferably an extrusion-molded extrusion covering resin layer. Therefore, hereinafter, the insulation layer will be described as the extrusion covering resin layer. Therefore, the resin which forms the extrusion covering resin layer is an extrusion-moldable thermoplastic resin.

The extrusion covering resin layer may be arranged in contact with the conductor on the outer periphery of the conductor, or may be arranged on other insulation layer(s), for example, outside the thermosetting resin layer.

Moreover, the extrusion covering resin layer may be in one layer or a plurality of layers.

In the present invention, the extrusion covering resin layer is composed of the mixed resin of the crystalline resin (A) and the resin (B) having a glass transition temperature (Tg) higher, by 30° C. or more, than the glass transition temperature of the crystalline resin (A), in which the glass transition temperature (Tg) is measured by a thermomechanical analysis.

The thermoplastic resin is broadly classified into a crystalline resin and an amorphous resin, in which the crystalline resin has a crystallization region in which molecular chains are regularly arranged, and one having a high proportion in an amount of this crystallization region is referred to as one having high crystallinity.

The crystalline resin has the glass transition temperature (Tg) and a melting point which is not exhibited in the amorphous resin, and a volume change (shrinkage) is caused in association with crystallization. However, the crystalline resin is generally superior to the amorphous resin, in mechanical strength, chemical resistance, slidability, stiffness, and spring property.

In the mixed resin to be used in the present invention, at least one thereof is the crystalline resin (A).

Specific examples of the crystalline resin (A) include: polyetheretherketone (PEEK), polyetherketoneketone (PEKK), polyetherketone (PEK), polyetheretherketoneketone (PEEKK), polyetherketoneetherketoneketone (PEKEKK), polyketone (PK), polyphenylenesulfide (PPS), polymethylpentene (PMP), polytetrafluoroethylene (PTFE), a tetrafluoroethylene/hexafluoropropylene copolymer (FEP), a tetrafluoroethylene/ethylene copolymer (ETFE), a tetrafluoroethylene/perfluoroalkylvinylether copolymer (PFA); aliphatic polyamide including polyamides 6, 66, 11, 12, 610, and 46; aromatic polyamide including polyamides 6T, 9T. MXD6, and polyphthalamide; aromatic polyester including polyethylene terephthalate (PET), polybutylene terephthalate (PBT), polyethylene naphthalate (PEN), polybutylene naphthalate (PBN), polydicyclohexylenedimethylene terephthalate (POT), polyphenylene ether (PPE), polyphenylene oxide (PPO), and a liquid crystal polymer (LOP); syndiotactic polystyrene (SPS), polyacetal (POM), polyvinyl alcohol (PVA), polyvinylidene chloride (PVDC), polyethylene (PE), and polypropylene (PP).

In the present invention, these resins also include a modified one. For example, modified polyetheretherketone (m-PEEK) is included in PEEK.

Among these, a resin having a high elastic modulus and high resistance against coating squeeze is suitable, and therefore it is preferable to use at least one resin selected form polyetheretherketone (PEEK), polyetherketoneketone (PEKK), polyetherketone (PEK), polyetherketoneetherketoneketone (PEKEKK), and polyphenylene sulfide (PPS).

Specific examples include: as PEEK, a commercially available product, such as KetaSpire KT-820 (trade name, manufactured by Solvay Specialty Polymers Japan K.K.), and PEEK 450G (trade name, manufactured by Victrex Japan Inc.); as modified PEEK, a commercially available product, such as AvaSpire AV-650 (trade name, manufactured by Solvay Specialty Polymers Japan K.K.); as PEKK, a commercially available product, such as Super Enpla PEKK (trade name, manufactured by Arkema K.K.); as PEK, a commercially available product, such as HT-G22 (trade name, manufactured by Victrex Japan Inc.); as PEKEKK, a commercially available product, such as ST-STG45 (trade name, manufactured by Victrex Japan Inc.); and as PPS, a commercially available product, such as DURAFIDE 0220A9 (trade name, manufactured by Polyplastics Co., Ltd.) and PPS FZ-2100 (trade name, manufactured by DIC Corporation).

In addition, the crystallinity includes relative crystallinity and absolute crystallinity, and in the present invention, the crystallinity means the relative crystallinity.

The relative crystallinity and the absolute crystallinity can be determined as described below.

$$\text{Relative crystallinity (\%)}=[(\text{crystal melting heat quantity}-\text{crystallization heat quantity})/(\text{crystal melting heat quantity})]\times 100$$

$$\text{Absolute crystallinity (\%)}=[\text{crystal melting heat quantity}/\text{melting heat of perfect crystal of resin}]\times 100$$

The crystal melting heat quantity and the crystallization heat quantity can be obtained by differential scanning calorimetry.

For example, an endothermic quantity (melting heat quantity) caused by melting as seen in a region over 300° C., and an exothermic quantity (crystallization heat quantity) caused by crystallization as seen around 150° C. are observed, by raising the temperature of PPS at a speed of 5° C./min. On the other hand, the melting heat quantity of the perfect crystal is a theoretical value, and the value theoretically determined in assumption of a perfectly crystallized state, because the melting heat quantity itself of the perfect crystal is unable to be observed.

When the crystallinity of the crystalline resin to be used is high, coating squeeze is hard to occur. On the other hand, mechanical properties, in particular, percent elongation at breakage, is lowered, and adhesion between the conductor and the coating, or between the coatings is deteriorated.

In the present invention, satisfaction of both the suppression of coating squeeze caused by the crystallinity of the above-described crystalline resin, and the mechanical properties is achieved in a relationship with the resin (B) to be combined.

Therefore, in the present invention, it is unnecessary to consider the crystallinity of the crystalline resin (A) to be used.

In addition, in the present invention, in addition to the mechanical properties, adhesion between the conductor and the insulation layer, or between the insulation layers can be maintained or improved without being lowered.

In the present invention, together with the above-described crystalline resin (A), use is made of the resin (B) having the glass transition temperature (Tg) higher, by 30° C. or more, than the glass transition temperature of the crystalline resin (A), in which the glass transition temperature (Tg) is measured by the thermomechanical analysis (TMA: also referred to as a TMA method or TMA measurement).

The above-described glass transition temperature (Tg) of the resin (B) is higher, preferably by 40° C. or more, more preferably by 50° C. or more, and further preferably by 60° C. or more, than the glass transition temperature of the crystalline resin (A). In addition, an upper limit of a difference in the glass transition temperatures between the crystalline resin (A) and the resin (B) is not particularly limited, but is practically 200° C. or less, and preferably 150° C. or less.

The resin (B) can suppress lowering of the elastic modulus of the crystalline resin (A) at the glass transition temperature (Tg) upon heating by adjusting the glass transition temperature (Tg) of the resin (B) relative to the glass transition temperature of the crystalline resin (A) in the above-described range, and therefore as a result, a lowering rate of the coating upon winding and heating can be suppressed. As the difference in the glass transition temperatures between the crystalline resin (A) and the resin (B) is larger, regions in which the elastic modulus is lowered for both of these resins are further separated, and thus for obtaining further preferred results against the coating squeeze upon heating. Conversely, if the difference in the glass transition temperatures between the crystalline resin (A) and the resin (B) is less than 30° C., lowering of the elastic modulus is unable to be suppressed, and thus for being unobtainable preferred results in measuring the break down voltage after heating in a state of being wound around the iron core.

The glass transition temperature (Tg) of the resin (A) is preferably 70° C. or higher, more preferably 80° C. or higher, further preferably 90° C. or higher, and particularly preferably 100° C. or higher. An upper limit thereof is not particularly limited, but is practically 200° C. or lower.

The glass transition temperature (Tg) can be measured by thermomechanical analysis (TMA), differential scanning calorimetry (DSC), or dynamic mechanical analysis (DMA), but in the present invention, the glass transition temperature (Tg) determined by the thermomechanical analysis (TMA) is applied to.

Herein, the thermomechanical analysis (TMA) means a method in which deformation of a substance is measured in terms of a function of temperature or time by applying a non-vibratory load, such as compression, tension, or bending, to while the temperature of a sample is changed according to a predetermined program. As the thermomechanical analysis, measurement can be carried out, by using a thermomechanical analyzer (for example, Thermomechanical Analyzer (TMA/SS) TMA 7000 Series, manufactured by Hitachi High-Technologies Corporation), or a dynamic mechanical analyzer (for example, DMA 8000, manufactured by PerkinElmer, Inc.) (trade names for both).

In addition, in the thermomechanical analysis (TMA), the glass transition temperature (Tg) is calculated from an inflection point in the thermomechanical analysis.

As the resin (B), either the crystalline resin or the amorphous resin is allowed to use.

Specific examples of the amorphous resin include: polyarylate (PAR), polysulfone (PSU), polyethersulfone (PES), polyamideimide (PAI), polyetherimide (PEI), thermoplastic polyimide (TPI), polycarbonate (PC), modified polyphenyleneether (m-PPE), polyvinyl chloride (PVC), polystyrene (PS), an ABS resin, an AS resin, and an acrylic resin (PMMA). Moreover, specific examples of the crystalline resin include: thermoplastic polyimide (TPI).

In addition, the amorphous resin has no melting point, which is different from the crystalline resin, and has only the glass transition temperature (Tg). Moreover, the amorphous resin has: transparency; a small volume change upon cooling and solidification; excellent creep property, weather resistance, and impact resistance; and small water absorption, but on the other hand, has poor chemical resistance, to cause stress cracking.

As the resin (B), in view of a higher glass transition temperature (Tg), and superb heat aging resistance, it is preferable to use at least one resin selected from polyphenylsulfone (PPSU), polysulfone (PSU), polyethersulfone (PES), polyetherimide (PEI), and thermoplastic polyimide (TR).

Specific examples include: as PPSU, a commercially available product, such as Radel R5800 (trade name, manufactured by Solvay Advanced Polymers Japan K.K.); as PSU, a commercially available product, such as Udel PSU (trade name, manufactured by Solvay Advanced Polymers Japan K.K.); as PES, a commercially available product, such as Sumikaexcel 4800G (trade name, manufactured by Sumitomo Chemical Co., Ltd.), PES (trade name, manufactured by Mitsui Chemicals, Inc.), Ultrason E (trade name, manufactured by BASF Japan Ltd.), and Radel A (trade name, manufactured by Solvay Advanced Polymers Japan K.K.); as PEI, a commercially available product, such as ULTEM 1010 (trade name, manufactured by SABIC Innovative Plastics Holding By); and as TPI, a commercially available product, such as AURUM PL450C (trade name, manufactured by Mitsui Chemicals, Inc.).

In the present invention, a mixing mass ratio of the crystalline resin (A) to the resin (B) (a mass of the crystalline resin (A):a mass of the resin (B)) is 90:10 to 51:49, preferably 90:10 to 60:40, and more preferably 80:20 to 60:40.

The mechanical properties and the adhesion can be maintained or improved by setting the mixing mass ratio to a value in the above-described range, and also lowering of the break down voltage upon winding can be suppressed.

Above all, the percent elongation at breakage in a tensile test n be improved.

For example, in PEEK and PEI, or PEEK and TPI, if PEEK being the crystalline resin (A) is contained in 51 mass % or more, the percent elongation at breakage under the following measurement condition is over 100%.

If the mixing mass ratio of the crystalline resin (A) is over 90, lowering of the break down voltage upon winding is not suppressed, and if the ratio is lower than 51, the percent elongation at breakage is lowered and thermal aging resistance is poor.

Herein, the percent elongation at breakage of the resin to be used in the extrusion covering resin layer is measured as described below.

The resin to be used in the extrusion covering resin layer is compression-molded, by using a hot press, into a thickness of 0.15 mm, and processed into a sheet. The sheet obtained is punched into a dumbbell piece (IEC-S type), and the resultant sample is applied as a test specimen. The tensile test is conducted at a tensile speed of 20 m/min by using a tensile tester. An average value of elongation at breakage between gauge marks is determined in a test in which the number of tests is 5 (n=5) by adjusting an inter-chuck distance to 25 mm. Herein, the average value of elongation at breakage between the gauge marks is necessary to be 80% or more.

A thickness of the extrusion covering resin layer is preferably 250 μm or less, and more preferably 180 μm or less. If the thickness of the extrusion covering resin layer is made to within the above-described preferable range, the insulated wire, which uses the extrusion covering resin layer, and which has stiffness (rigidity), has enough flexibility, and therefore the resultant insulated wire does not become affecting any change in characteristics maintaining the electrical insulation property before and after working. On the other hand, in view of capability of preventing poor insulation, the thickness of the extrusion covering resin layer is preferably 5 μm or more, and more preferably 15 μm or more. In this preferred embodiment, when the conductor is rectangular, the thickness of the extrusion covering resin layers arranged on first facing two sides and second corresponding two sides among four sides of a rectangle are each preferably 200 μm or less.

(Method of Forming the Extrusion Covering Resin Layer)

On the conductor or an outer peripheral surface of the conductor (also referred to as an enameled wire) on which the thermosetting resin layer is formed, the mixed resin of the resin (A) and the resin (B) to be used in the extrusion covering resin layer, by using a co-extruder, or each resin thereof, is simultaneously extruded, to form the extrusion covering resin layer. The mixed resin is formed into a melted state at a temperature higher than a glass transition temperature of the resin, and is extruded onto the conductor or the enameled wire, and brought into contact therewith. In the case of the enameled wire having the thermosetting resin layer, the extrusion covering resin is thermally bonded onto the thermosetting resin layer, to form the extrusion covering resin layer.

In addition, the thermoplastic resin layer (for example, the layer composed of the mixed resin to be used in the present invention), can also be formed, by using an organic solvent or the like and a thermoplastic resin.

A screw of an extruder is not particularly limited, and specific examples thereof include: a 30 mm full-flight screw, in which L/D=20 and a compression ratio is 3. With regard to extrusion temperature conditions, it is preferable to divide a cylinder into at least 3 zones, C1, C2, and C3, sequentially from a raw material-resin charging side, to adjust each temperature of the cylinder in the extruder, and temperatures of a head part (H) and a die part (D) are further adjusted. A temperature of the C1 zone is preferably 260 to 310° C., a temperature of the C2 zone is preferably 300 to 380° C., and a temperature of the C3 zone is preferably 310 to 380° C. Moreover, a temperature of the head part (H) is preferably 320 to 390° C., and a temperature of the die part (D) is preferably 320 to 390° C. As the extrusion die, use may be made of: a die analogue to the conductor and capable of obtaining the required thickness.

<Thermosetting Resin Layer>

The insulated wire of the present invention may be provided with other insulation layer(s), in addition to the above-described extrusion covering resin layer.

In the present invention, in order to improve the adhesion between the conductor and the extrusion covering resin layer, among other insulation layer(s), the thermosetting resin layer (also referred to as an enameled layer in this case) is preferably provided on an outer periphery of the conductor, and particularly preferably provided between the conductor and the extrusion covering resin layer.

As the thermosetting resin layer, at least one layer is preferably arranged in an enamel resin, but a plurality of layers may be arranged therein. In addition, one layer of the thermosetting resin layer means inclusion of a layer prepared by repeatedly baking the same varnish in order to increase the thickness thereof, and the layer formed by different varnish is counted as another layer.

As the enamel resin for forming the thermosetting resin layer, a conventionally used one can be used. Specific examples thereof include: polyimide (PI), polyamideimide (PAI), polyesterimide (PEsI), polyetherimide (PEI), polyimide hydantoin-modified polyester, polyamide (PA), formal, polyurethane (PU), polyester (PE), polyvinylformal, epoxy, and polyhydantoin. Among these, it is preferable to use: a polyimide resin having excellent heat resistance, such as polyimide (PI), polyamideimide (PAI), polyesterimide (PEsI), polyetherimide (PEI), and polyimide hydantoin-modified polyester; and H-class polyester (HPE).

In the present invention, it is particularly preferable to use: a resin selected from: polyamideimide (PAI), polyetherimide (PEI), polyimide (PI), and H-class polyester (HPE).

The polyamideimide (PAI) only needs be a thermosetting one, and use may be made of: a commercially available product (for example, trade name: U imide, (manufactured by Unitika Ltd.), trade name: U-Varnish, (manufactured by Ube Industries, Ltd.), or trade names: HCl series, (manufactured by Hitachi Chemical Co., Ltd.)); or use may be made of one obtained, by allowing, for example, tricarboxylic anhydride to directly react with diisocyanate in a polar solvent, in a usual manner, or use may be made of one obtained, by first allowing tricarboxylic anhydride to react with diamine in a polar solvent, to introduce an imide bond thereinto, and then forming amide with diisocyanate. In addition, the polyamideimide has lower thermal conductivity and higher break down voltage in comparison with other resins, and can be cured through backing.

Specific examples of the polyetherimide include: a commercially available product, such as ULTEM 1010 (trade name, manufactured by SABIC Innovative Plastics Holding By).

The polyimide is not particularly restricted, and use may be made of: conventional polyimide, such as wholly aromatic polyimide and thermosetting aromatic polyimide. For example, use may be made of: a commercially available product (trade name: HI 406, manufactured by Hitachi Chemical Co., Ltd.); or one prepared, by using a polyamic acid solution obtained by allowing aromatic tetracarboxylic dianhydride to react with aromatic diamine in a polar solvent in a usual manner, forming polyimide by heat treatment in baking upon covering.

The H-class polyester (HPE) means one prepared by modifying the resin by adding a phenolic resin or the like among aromatic polyesters, in which a thermal resistance class thereof is H-class. Specific examples of a commercially available H-class polyester include: Isonel 200 (trade name, manufactured by Schenectady International Inc., in the U.S.A.).

In the enamel resin, one kind of these may be used alone, or two or more kinds thereof may be mixed and used.

In view of capability of reducing the number of times of passing the wire through a baking furnace upon forming the enameled layer, and preventing excessive reduction of bonding force between the conductor and the thermosetting resin layer, a thickness of the thermosetting resin layer is preferably 60 μm or less, and more preferably 50 μm or less. Moreover, in order to prevent damage on withstand voltage characteristics or heat resistance characteristics, which are properties required for the enameled wire as the insulated wire, it is preferable that the thermosetting resin layer has a thickness of a certain degree. A lower limit of the thickness of the thermosetting resin layer is not particularly limited, as long as it is a thickness at which no pinholes are formed, and is preferably 3 μm or more, and more preferably 6 μm or more. When the conductor is rectangular, all of the thicknesses of the thermosetting resin layers arranged on first facing two sides and second corresponding two sides in four sides of the rectangle are each preferably 60 μm or less.

The thermosetting resin layer can be preferably formed by applying and baking resin varnish containing the above-mentioned enamel resin on the conductor a plurality of times.

The resin varnish contains an organic solvent and the like so as to make the thermosetting resin be a varnish. The organic solvent is not particularly limited as long as the organic solvent does not inhibit the reaction of the thermosetting resin, and examples thereof include: amide-based solvents, such as N-methyl-2-pyrrolidone (NMP), N,N-dimethylacetamide (DMAC), and N,N-diemthylformamide (DMF); urea-based solvents, such as N,N-dimethylethyleneurea, N,N-dimethylpropyleneurea, and tetramethylurea; lactone-based solvents, such as γ-butyrolactone and γ-caprolactone; carbonate-based solvents, such as propylene carbonate; ketone-based solvents, such as methyl ethyl ketone, methyl isobutyl ketone, and cyclohexanone; ester-based solvents, such as ethyl acetate, n-butyl acetate, butyl cellosolve acetate, butyl carbitol acetate, ethyl cellosolve acetate, and ethyl carbitol acetate; glyme-based solvents, such as diglyme, triglyme, and tetraglyme; hydrocarbon-based solvents, such as toluene, xylene, and cyclohexane; phenol-based solvents, such as cresol, phenol, and halogenated phenol; sulfone-based solvents, such as sulfolane; and dimethylsulfoxide (DMSO).

Of these organic solvents, in view of high solubility, high reaction acceleration property and the like, amide-based solvents, phenol-based solvents, and urea-based solvents are preferred; and in view of a solvent without a hydrogen atom that is apt to inhibit a crosslinking reaction due to heating, amide-based solvents, phenol-based solvents, urea-based solvents, and dimethylsulfoxide are preferred; amide-based solvents and dimethylsulfoxide are particularly preferred.

The resin varnish to be used in the present invention may contain various additives, within the range in which the characteristics are not affected, such as a cell nucleating agent, an antioxidant, an antistatic agent, an ultraviolet radiation inhibitor, a light stabilizer, a fluorescent whitening agent, a pigment, a dye, a compatibilizer, a lubricant, a reinforcing agent, a flame retardant, a crosslinking agent, a crosslinking coagent, a plasticizer, a thickening agent, a viscosity reducer, and an elastomer. Moreover, a layer formed of the resin containing any of these additives may be laminated on the resultant insulated wire, or the insulated wire may be coated with a coating material containing any of these additives.

In order to improve an elastic modulus of the thermosetting resin layer, the resin varnish may be baked, after powder having a high aspect ratio, such as glass fibers or carbon nanotubes, is added to the coating material. The powder is aligned in a direction of flowing of the wire in working in such a manner, and the elastic modulus in a bending direction is reinforced.

The method of coating the resin varnish may be in a usual manner. Examples of the coating method include: a method of employing a die for varnish coating, which has been manufactured so as to be similar to the shape of the conductor; and a method of employing a die that is called "universal die", which has been formed in a curb shape when the cross-sectional shape of the conductor is quadrangular. The conductor having the resin varnish containing enameled resin coated thereon, is baked by a baking furnace in a usual manner. Although specific baking conditions depend on the shape of a furnace to be used, in the case where the furnace is an about 5 m-sized vertical furnace by natural convection, the baking can be achieved by setting the passing time period to 10 to 90 sec at the furnace temperature of 400 to 500° C.

<Method of Producing the Insulated Wire>

The method of producing the insulated wire of the present invention refers to the method of producing the insulated wire having at least one layer of the insulation layer, including the extrusion covering resin layer, on the outer periphery of the conductor as described above.

That is, in the insulated wire obtained by the production method of the present invention, the extrusion covering resin layer is composed of the mixed resin of the resin (A) and the resin (B) each having different glass transition temperature (Tg); the resin (A) is the crystalline resin; and the resin (B) has a glass transition temperature higher, by 30° C. or more, than a glass transition temperature of the crystalline resin (A), in which the glass transition temperature is measured by a thermomechanical analysis, and a mixing mass ratio of the mixed resin (a mass of the crystalline resin (A):a mass of the resin (B)) is 90:10 to 51:49.

Moreover, the method of producing the insulated wire of the present invention includes, for example, a step of extruding the resin composition containing the above-mentioned mixed resin, on the outer periphery of the conductor, to form the above-described extrusion covering resin layer.

Details of the method of forming the individual layers are as described in the extrusion covering resin layer and the thermosetting resin layer.

<Use>

The insulated wire of the present invention is applicable to a field which requires resistance to voltage and heat resistance, such as various kinds of electric equipment. For example, the insulated wire of the present invention is used for a motor, a transformer, and the like, which can compose high-performance electric equipment, by being processed into a coil. In particular, the insulated wire is preferably used as a winding wire for a driving motor of HV (hybrid vehicles) and EV (electrical vehicles). As just described, the present invention can provide electronic or electric equipment, particularly a driving motor of HV and EV, equipped with a coil formed by winding the insulated wire. Meanwhile, in the case where the insulated wire of the present invention is used for a motor coil, it is also called an insulated wire for the motor coil.

In particular, the insulated wire can be preferably used as an insulated winding wire for the electronic or electrical equipment, particularly for the driving motor in HV and EV, in which the temperature will reach a level over 200° C.

EXAMPLES

The present invention will be described in more detail based on examples given below, but the invention is not meant to be limited by these.

Example 1

According to the following manners, an insulated wire was produced, as an embodiment without having any thermosetting resin layer, shown in FIG. 1.

There was provided a rectangular conductor in size 1.8 mm×3.3 mm (thickness×width), curvature radius of chamfered corners at four corners r=0.3 mm (copper having an oxygen content of 15 ppm). The extrusion covering resin layer being the second insulation layer was formed on an outer periphery of this conductor as described below.

As resins to be extruded and covered, use was made of: polyetheretherketone (PEEK) [trade name: KetaSpire KT-880, glass transition temperature (Tg): 143° C., manufactured by Solvay Specialty Polymers Japan K.K.] and polyphenylsulfone (PPSU) [trade name: Radel R-5800, glass transition temperature (Tg): 218° C., manufactured by Solvay Specialty Polymers Japan K.K.], in mass ratios in Table 1 below.

As a screw of an extruder, a 30 mm full-flight screw, in which L/D=20 was used, and in which a compression ratio was set to 3. Extrusion temperature conditions were set to C1: 300° C., C2: 370° C., C3: 380° C., H: 390° C., D: 390° C., respectively. Herein, C1, C2, and C3 represent temperatures of a cylinder in the extruder to sequentially indicate temperatures of three (3) zones from a raw material-resin charging side. Moreover, H represents a temperature of a head part, and D represents a temperature of a die part.

A 30 µm-thick extrusion covering resin layer was formed, by performing extrusion covering of the above-described resin, by using the extrusion die, and then performing water-cooling, to obtain the insulated wire having the extrusion covering resin layer composed of the mixed resin of PEEK and PPSU on the conductor.

Examples 2 to 4, Comparative Examples 1 to 5

Insulated wires were produced in the same manner as in Example 1, except that each of resins is combined with, as shown in Tables 1 and 2, respectively.

Example 5

According to the following manners, an insulated wire was produced, which had the extrusion covering resin layer and the thermosetting resin layer, shown in FIG. 1.

There was provided a rectangular conductor in size 1.8 mm×3.3 mm (thickness×width), curvature radius of chamfered corners at four corners r=0.3 mm (copper having an oxygen content of 15 ppm). In forming the thermosetting resin layer of the first insulating later, a 39 µm-thick enameled layer was formed, by coating a polyamideimide resin (PAI) varnish (trade name: HI406, manufactured by Hitachi Chemical Co., Ltd.) on the conductor by using a die analogous to a shape of the conductor, and passing the resultant conductor through a baking furnace set at a furnace temperature of 450° C. and having a furnace length of 8 m at a speed at which a baking time became 15 seconds, to form an enamel having a thickness of 5 µm per one baking step. By repeating this operation for eight (8) times, thus the 39 µm-thick enameled layer was obtained, and therefor obtaining an enameled wire with a 39 µm-thickness of coating.

The extrusion covering resin layer being the second insulation layer was formed outside this enameled layer, by applying the enameled wire obtained as a core wire.

As resins to be extruded and covered, use was made of: polyetheretherketone (PEEK) [trade name: KetaSpire KT-880, glass transition temperature (Tg): 143° C., manufactured by Solvay Specialty Polymers Japan K.K.] and polyetherimide (PEI) [trade name; ULTEM 1010, glass transition temperature (Tg): 213° C., manufactured by SABIC Innovative Plastics Holding BV], in mass ratios in Table 1 below.

As a screw of an extruder, a 30 mm full-flight screw, in which L/D=20 was used, and in which a compression ratio was set to 3. Extrusion temperature conditions were set to C1: 300° C., C2: 370° C., C3: 380° C., H: 390° C., D: 390° C., respectively. Herein, C1, C2, and C3 represent temperatures of a cylinder in the extruder to sequentially indicate temperatures of three (3) zones from a raw material-resin charging side. Moreover, H represents a temperature of a head part, and D represents a temperature of a die part.

A 150 µm-thick extrusion covering resin layer was formed, by performing extrusion covering of the above-described resin, by using the extrusion die, and then performing water-cooling, to obtain the insulated wire having the extrusion covering resin layer composed of the mixed resin of PEEK and PEI on the enameled wire, and having 189 µm in a total thickness (a total of a thickness of the enameled layer and a thickness of the extrusion covering resin layer).

Examples 6 to 10, Comparative Examples 6 and 7

Insulated wires were produced in the same manner as in Example 5, except that each of resins to be used: in the first insulation layer of the thermosetting resin layer and the second insulation layer of the extrusion covering resin layer, is combined with, as shown in Tables 1 and 2, respectively.

In addition, the resins to be used, were the following resins:

Thermosetting Resin

Polyamideimide (PAI) resin varnish [trade name: HI 406, manufactured by Hitachi Chemical Co., Ltd.]

Polyimide (PI) resin varnish [trade name: U imide, manufactured by Unitika Ltd.]

Crystalline Resin (A)

Polyetheretherketone (PEEK) [trade name: KetaSpire KT-880; glass transition temperature (Tg): 143° C., manufactured by Solvay Specialty Polymers Japan K.K.]

Polyetherketone (PEK) [trade name: HT-G22, glass transition temperature (Tg): 162° C., manufactured by Victrex Japan Inc.]

Polyphenylenesulfide (PPS) [trade name: DURAFIDE 0220A9, glass transition temperature (Tg): 89'C, manufactured by Polyplastics Co., Ltd.]

Polyetherketoneketone (PEKK) [trade name: Super Enpla PEKK, glass transition temperature (Tg): 160° C., manufactured by Arkema Japan K.K.].

Resin (B)

Polyphenyisulfone (PPSU) [trade name: Radel R5800, glass transition temperature (Tg): 218° C., manufactured by Solvay Advanced Polymers Japan K.K.]

Polyetherimide (PEI) [trade name: ULTEM 1010, glass transition temperature (Tg): 213° C., manufactured by SABIC Innovative Plastics Holding BV]

Thermoplastic polyimide (TPI) [trade name: AURUM PL450C, glass transition temperature (Tg): 225'C, manufactured by Mitsui Chemicals, Inc.,]

Polysulfone (PSU) [trade name: Udel P-1700, glass transition temperature (Tg): 83° C. manufactured by Solvay Advanced Polymers Japan K.K.]

Polyethersulfone (PES) [trade name: Sumikaexcel 3600G, glass transition temperature (Tg): 225° C., manufactured by Sumitomo Chemical Co., Ltd.]

High-density polyethylene (HOPE) [trade name: HI-ZEX 5000SF, glass transition temperature (Tg): 0° C. or lower, manufactured by Prime Polymer Co., Ltd.]

Syndiotactic polystyrene (SPS) [trade name: XAREC 5105, glass transition temperature (Tg): 100° C., manufactured by Idemitsu Kosan Co., Ltd.]

Perfluoro-ethylene/propene copolymer (FEP) [trade name: NP-101, glass transition temperature (Tg): 80° C., manufactured by Daikin Industries, Ltd.]

The following evaluation in the items was made on each insulated wire prepared as described above.

[Glass Transition Temperature (Tg)]

The glass transition temperature of the crystalline resin (A) and the resin (B) to be used in the extrusion covering resin layer being the second insulation layer was determined by a thermomechanical analysis (TMA). In the thermomechanical analysis (TMA), use was made of a dynamic mechanical analyzer (trade name: DMA 8000, manufactured by PerkinElmer, Inc.), and measurement was carried out according to a TMA mode.

[Break Down Voltage (BDV) after Heating, being Wound Around the Iron Core]

Characteristics maintaining electrical insulation after heating were evaluated as described below.

Each insulated wire was wound, 10 times, around an iron core having a diameter of 30 mm, and the resultant sample was heated to 200° C. in a thermostatic bath, and held for 30 minutes therein. The resultant sample was taken out from the thermostatic bath, and then the iron core was inserted into copper grains in keeping the state of being wound around the iron core, and one end of the wound insulated wire was connected to an electrode. A case where passing of electric current therethrough for 1 minute at a voltage of 8 kV was able to be held without causing dielectric breakdown was deemed to pass the test, and expressed by "B" in Tables 1 and 2 described below.

Moreover, a case where passing of electric current therethrough for 1 minute at a voltage of 10 kV was able to be held without causing dielectric breakdown was deemed to be particularly excellent, and expressed by "A."

In addition, a case where passing of electric current therethrough for 1 minute at a voltage of 8 kV was unable to be held without causing dielectric breakdown was deemed not to pass the test, and expressed by "C." Herein, when the dielectric breakdown is caused, flexibility of an electric wire becomes poor, a change, such as whitening, is caused, and even cracks are caused, on a surface of the electric wire in several cases.

In addition, the break down voltage was expressed in "Winding BDV" in Tables 1 and 2.

[Percent Elongation at Breakage]

Percent elongation at breakage of the resins to be used in the extrusion covering resin layer of the second insulation layer was evaluated as described below.

A sheet was prepared, by performing compression molding of the resin(s) to be used in the extrusion covering resin layer of the second insulation layer into a thickness of 0.15 mm, by a hot press machine. A test specimen was prepared, by punching the sheet obtained into a dumbbell piece (IEC-S type). A tensile test was conducted at a tensile speed of 20 m/min, by using, for the measurement, a tensile tester (Autograph, trade name: AGS-J, manufactured by Shimadzu Corporation). An average value of percent elongation at breakage between gauge marks was measured in a test in which the number of tests is 5 (n=5) by setting a chuck length to 25 mm, and the results were evaluated in the following criteria: a case where the percent elongation at breakage was 80% or more was deemed to pass the test, and expressed by "A"; and a case where the percent elongation at breakage was less than 80% was deemed not to pass the test, and expressed by "C."

[Thermal Aging Resistance Test]

Thermal aging resistance was evaluated as described below.

With reference to "3. Thermal shock resistance (applied to enameled wires and tape winding wires)" in JIS C 3216-6 "Winding wires-test method—Part 1; General)," whether or not cracks were generated in the insulation layer was confirmed with the naked eyes, immediately after each insulated wire which was elongated by 1% in a length direction, was allowed to stand in a thermostatic bath at 200° C. for 500 hours.

A case where the cracks were not confirmed in any of the insulation layer was deemed to pass the test, and expressed by "B"; and a case where the cracks were confirmed was deemed not to pass the test, and expressed by "C."

Moreover, in the same manner, even if each insulated wire was allowed to stand in the above-described thermostatic bath over 1,000 hours, a case where the cracks were not confirmed in both of the thermosetting resin layer and the extrusion covering resin layer, was deemed to be particularly excellent, and expressed by "A."

The results obtained were collectively shown in Tables 1 and 2.

TABLE 1

|  |  |  | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|---|---|
| First insulation layer (insulation layer in lower layer) | Thermosetting resin layer | Kind | — | — | — | — | PAI | PAI | PAI | PI | PI | PAI |
|  |  | Thickness (μm) | — | — | — | — | 39 | 30 | 40 | 30 | 40 | 30 |
| Second insulation layer | Crystalline resin (A) | Kind | PEEK | PEK | PEKK | PEEK | PEEK | PPS | PEEK | PEEK | PEKK | PEEK |
|  |  | Tg (° C.) | 143 | 162 | 160 | 143 | 143 | 89 | 143 | 143 | 160 | 143 |
|  |  | Mass ratio (%) | 67 | 55 | 80 | 85 | 70 | 90 | 55 | 90 | 80 | 65 |
|  | Resin (B) | Kind | PPSU | PEI | TPI | PSU | PEI | PPSU | PES | PSU | TPI | PES |
|  |  | Tg (° C.) | 218 | 213 | 225 | 183 | 213 | 218 | 225 | 183 | 225 | 225 |
|  |  | Mass ratio (%) | 33 | 45 | 20 | 15 | 30 | 10 | 45 | 10 | 20 | 35 |
|  | Mass ratio resin (A):resin (B) |  | 67:33 | 55:45 | 80:20 | 85:15 | 70:30 | 90:10 | 55:45 | 90:10 | 80:20 | 65:35 |
|  | Second insulation layer thickness (μm) |  | 30 | 80 | 100 | 120 | 150 | 100 | 100 | 120 | 120 | 80 |
| Performance evaluation | Winding BDV |  | A | A | A | B | A | A | A | B | A | A |
|  | Percent elongation at breakage |  | A | A | A | A | A | A | A | A | A | A |
|  | Thermal aging resistance test |  | B | B | B | B | A | B | A | A | A | A |

Remarks:
'Ex' means Example according to this invention.

TABLE 2

|  |  |  | CEx 1 | CEx 2 | CEx 3 | CEx 4 | CEx 5 | CEx 6 | CEx 7 |
|---|---|---|---|---|---|---|---|---|---|
| First insulation layer (insulation layer in lower layer) | Thermosetting resin layer | Kind | — | — | — | — | — | PAI | PAI |
|  |  | Thickness (μm) | — | — | — | — | — | 30 | 40 |
| Second insulation layer | Crystalline resin (A) | Kind | PEEK | PEK | PEEK | PEEK | PEEK | PEEK | PPS |
|  |  | Tg (° C.) | 143 | 162 | 143 | 143 | 143 | 143 | 89 |
|  |  | Mass ratio (%) | 100 | 80 | 30 | 60 | 70 | 20 | 45 |
|  | Resin (B) | Kind | — | PSU | PES | HDPE | FEP | PES | PPSU |
|  |  | Tg (° C.) | — | 183 | 225 | <0 | 80 | 225 | 218 |
|  |  | Mass ratio (%) | — | 20 | 70 | 30 | 30 | 80 | 55 |
|  | Resin (B) | Kind | — | — | — | SPS | — | — | — |
|  |  | Tg (° C.) | — | — | — | 100 | — | — | — |
|  |  | Mass ratio (%) | — | — | — | 10 | — | — | — |
|  | Mass ratio resin (A):resin (B) |  | 100:0 | 80:20 | 30:70 | 60:40 | 70:30 | 20:80 | 45:55 |
|  | Second insulation layer thickness (μm) |  | 30 | 80 | 100 | 100 | 25 | 100 | 100 |
| Performance evaluation | Winding BDV |  | C | C | B | C | C | B | B |
|  | Percent elongation at breakage |  | A | A | C | A | A | C | C |
|  | Thermal aging resistance test |  | B | B | C | C | C | C | C |

Remarks:
'CEx' means Comparative Example.

From the results shown in Tables 1 and 2, the followings can be found.

As is found from Comparative Example 1, in the conventional insulated wire in which the resin in the extrusion covering resin layer being the insulation layer was composed of only the crystalline resin, if the resultant insulated wire was heated to a high temperature of 200° C. in a state of being wound around the iron core, the break down voltage (BDV) after heating was lowered. Moreover, in Comparative Examples 4 and 5, in which the glass transition temperature (Tg) of the resin (B) to be combined with the crystalline resin (A) was lower than the glass transition temperature (Tg) of the crystalline resin (A), or in Comparative Example 2, in which even if the glass transition temperature (Tg) of the resin (B) was higher than the glass transition temperature (Tg) of the crystalline resin (A), the difference was less than 30° C., both the break down voltage (BDV) upon heating and the percent elongation at breakage or the thermal aging resistance were not satisfied, and an evaluation in any of the properties became poor.

Moreover, in Comparative Examples 3, 6, and 7, while the relationship of the glass transition temperature (Tg) was satisfied, an amount of blending the crystalline resin (A) was too small, and evaluations of both of the percent elongation at breakage and the thermal aging resistance became poor.

To the contrary to above, the combination of the resins according to the present invention was applied to the resin in the extrusion covering resin layer being the insulation layer. Thus, the insulated wire of the present invention had excellent thermal aging resistance at a high temperature of 200° C., and also maintained or improved mechanical properties without being lowered, and suppressed coating squeeze. Further, lowering of the break down voltage after heating in the state of being wound around the iron core was suppressed. Thus, both suppression of lowering of the break down voltage, and the mechanical properties, which has been difficult in the conventional technology, were able to be satisfied at the same time.

Moreover, according to the method of producing the insulated wire of the present invention, the insulated wire having the above-described excellent performance was able to be produced.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Insulated wire
11 Conductor
12 Thermosetting resin layer
13 Extrusion covering resin layer

The invention claimed is:

1. An insulated wire, comprising at least one layer as an insulation layer, on an outer periphery of a conductor, wherein
at least one layer as the insulation layer is composed of a mixed resin of a crystalline resin (A) and a resin (B) having a glass transition temperature higher, by 30° C. or more, than a glass transition temperature of the crystalline resin (A), in which the glass transition temperature is measured by a thermomechanical analysis, and a mixing mass ratio of the mixed resin (a mass of the crystalline resin (A):a mass of the resin (B)) is 90:10 to 51:49, and
wherein the crystalline resin (A) includes at least one resin selected from polyetheretherketone, polyetherketoneketone, polyetherketone, polyetherketoneetherketone, and polyphenylene sulfide.

2. The insulated wire claimed in claim 1, wherein the glass transition temperature of the resin (B) is higher, by 50° C. or more, than the glass transition temperature of the crystalline resin (A).

3. The insulated wire claimed in claim 1, wherein the resin (B) includes at least one resin selected from polyphenylsulfone, polysulfone, polyethersulfone, and polyetherimide.

4. The insulated wire claimed in claim 1, wherein the insulation layer composed of the mixed resin is an extrusion covering resin layer.

5. The insulated wire claimed in claim 1, comprising a thermosetting resin layer including at least one resin selected from polyamideimide, polyetherimide, polyimide, and H-class polyester, on the outer periphery of the conductor.

6. A coil, wherein the insulated wire claimed in claim 1 is subjected to winding working.

7. An electric or electronic equipment, comprising the coil claimed in claim 6.

8. A method of producing an insulated wire, comprising at least one layer as an insulation layer, on an outer periphery of a conductor, wherein
at least one layer as the insulation layer is composed of a mixed resin of a crystalline resin (A) and a resin (B) having a glass transition temperature higher, by 30° C. or more, than a glass transition temperature of the crystalline resin (A), in which the glass transition temperature is measured by a thermomechanical analysis, and a mixing mass ratio of the mixed resin (a mass of the crystalline resin (A):a mass of the resin (B)) is 90:10 to 51:49, and wherein
the method comprises: a step of extruding a resin composition, including the mixed resin, on the outer periphery of the conductor, to form the insulation layer.

9. The method of producing the insulated wire claimed in claim 8, comprising: a step of forming a thermosetting resin layer including at least one resin selected from polyamideimide, polyetherimide, polyimide, and H-class polyester, on the outer periphery of the conductor.

* * * * *